United States Patent
Malette et al.

(10) Patent No.: US 7,200,190 B2
(45) Date of Patent: Apr. 3, 2007

(54) UNBIASED SIGNAL TO INTERFERENCE RATIO IN WIRELESS COMMUNICATIONS DEVICES AND METHODS THEREFOR

(75) Inventors: Alexandre Malette, Chicago, IL (US); John P. Oliver, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 369 days.

(21) Appl. No.: 10/609,939

(22) Filed: Jun. 30, 2003

(65) Prior Publication Data

US 2004/0264604 A1 Dec. 30, 2004

(51) Int. Cl.
*H04L 27/06* (2006.01)

(52) U.S. Cl. ........................... 375/340; 375/350

(58) Field of Classification Search ................ 375/150, 375/340, 343, 350
See application file for complete search history.

(56) References Cited

U.S. PATENT DOCUMENTS

| | | | | |
|---|---|---|---|---|
| 4,706,263 A * | 11/1987 | von der Embse | ............ | 375/343 |
| 5,450,453 A * | 9/1995 | Frank | .......................... | 375/130 |
| 5,455,967 A * | 10/1995 | Amezawa et al. | ............. | 455/69 |
| 5,819,168 A * | 10/1998 | Golden et al. | .............. | 455/303 |
| 5,839,056 A * | 11/1998 | Hakkinen | ..................... | 455/69 |
| 6,292,519 B1 * | 9/2001 | Popovic | ....................... | 375/346 |
| 6,366,605 B1 * | 4/2002 | Schilling | ..................... | 375/147 |
| 6,690,944 B1 * | 2/2004 | Lee et al. | ..................... | 455/522 |
| 6,775,521 B1 * | 8/2004 | Chen | ........................ | 455/67.11 |
| 6,822,998 B1 * | 11/2004 | Yun et al. | .................... | 375/130 |
| 2002/0101832 A1 * | 8/2002 | Chen et al. | ................. | 370/318 |
| 2003/0043893 A1 * | 3/2003 | Jard et al. | .................... | 375/152 |
| 2003/0224836 A1 * | 12/2003 | Tsai et al. | .................... | 455/573 |
| 2004/0071202 A1 * | 4/2004 | Won et al. | ................... | 375/227 |
| 2004/0076132 A1 * | 4/2004 | Tiirola et al. | ............... | 370/335 |
| 2004/0153950 A1 * | 8/2004 | Tapaninen et al. | .......... | 714/776 |
| 2004/0184398 A1 * | 9/2004 | Walton et al. | .............. | 370/203 |
| 2004/0196891 A1 * | 10/2004 | Tapaninen | ................... | 375/148 |
| 2004/0203397 A1 * | 10/2004 | Yoon et al. | ................. | 455/63.1 |
| 2005/0207476 A1 * | 9/2005 | Anderson | .................... | 375/147 |

FOREIGN PATENT DOCUMENTS

WO  WO 99/66643  12/1999
WO  WO 2004/051902 A1 *  6/2004

* cited by examiner

*Primary Examiner*—Emmanuel Bayard
*Assistant Examiner*—Lawrence Williams
(74) *Attorney, Agent, or Firm*—Roland K. Bowler, II

(57) ABSTRACT

A method in a wireless communications device, for example, 3$^{rd}$ Generation (3G) Universal Mobile Telephone System (UMTS) user equipment, including estimating (210) noise power of a signal, estimating signal power (220) of the signal, estimating a signal to noise ratio (230) based on the estimated noise power and the estimated signal power, and at least partially unbiasing (240) the estimated signal to noise ratio based on the interval over which the noise power is averaged.

30 Claims, 2 Drawing Sheets

UNBIASED SIGNAL TO INTERFERENCE RATIO IN WIRELESS COMMUNICATIONS DEVICES AND METHODS THEREFOR

FIELD OF THE DISCLOSURE

The present disclosure relates generally to wireless communications, and more particularly to estimating signal-to-interference ratios (SIRs) in wireless communications devices, for example, in a rake receiver of W-CDMA based user equipment, devices and methods.

BACKGROUND OF THE DISCLOSURE

The performance of W-CDMA communications systems employing fast power control is generally dependent on an inner-loop power control algorithm, which requires an estimation of a signal-to-interference ratio (SIR), also referred to herein as the signal-to-noise ratio (SNR), at the output of the rake receiver. In W-CDMA communications systems, the mobile user equipment (UE) transmits to the network a power control command based on estimated SNR, at a 1500 Hz (slot) rate, for use in controlling transmission power at the network. The estimated SNR is also used by mobile user equipment for base station selection.

It is known to estimate the signal to noise ratio based on the ratio of a biased signal power estimator and a biased noise power estimator. The problem associated with this known SNR estimator is that it is characterized by a strong bias and substantial variance. Merely providing unbiased signal and noise estimators is generally insufficient to ensure that the resulting SNR estimator will be unbiased. Furthermore, since bias is a function of the signal to noise ratio, the performance of the SNR is potentially sensitive to the actual signal and noise power, particularly under diverse channel conditions, for example, those typical of multi-path fading propagation channels in wireless communications systems.

WO 99/66643 entitled "Device And Method For Measuring Non-Orthogonal Noise Power For CDMA Communication System" discloses detecting non-orthogonal noise power by squaring a difference between adjacent symbols.

Beaulieu et al. proposes in a publication entitled "Comparison of Four SNR Estimators for QPSK Modulations" IEEE Communications Letters, Vol. 4, No. 2, February 2000 an empirical method for compensating for over-estimation of SNR that results in an approximately unbiased SNR estimator when the SNR is large and the channel, which includes additive white Gaussian noise (AWGN), is not fading. However, the SNR level on each path of multi-path fading propagation channels typical of wireless communications systems are usually relatively low. Therefore, the scheme proposed by Bealieu is unsuitable for unbiasing an estimated SNR in wireless communications applications.

The various aspects, features and advantages of the disclosure will become more fully apparent to those having ordinary skill in the art upon careful consideration of the following Detailed Description thereof with the accompanying drawings described below.

DETAILED DESCRIPTION

The present disclosure relates generally to providing an unbiased signal to noise ratio (SNR) estimator in wireless communications devices, for example, in $3^{rd}$ Generation (3G) Universal Mobile Telephone System (UMTS) W-CDMA implementation wireless communications devices, also referred to as user equipment (UE). The disclosure relates more particularly to methods for unbiasing SNR estimators in the wireless communications devices. For mobile wireless communications applications, the SNR is preferably unbiased substantially if not completely for all channel conditions and SNR levels.

In W-CDMA cellular communications systems, for example, in $3^{rd}$ Generation Universal Mobile Telephone System (3G UMTS) wireless communications networks, wireless mobile communications devices transmit SNR estimation information to the network, which uses the SNR information to allocate downlink transmission power resources. The signal to noise ratio estimation may also be used for base station selection.

Figure 1:
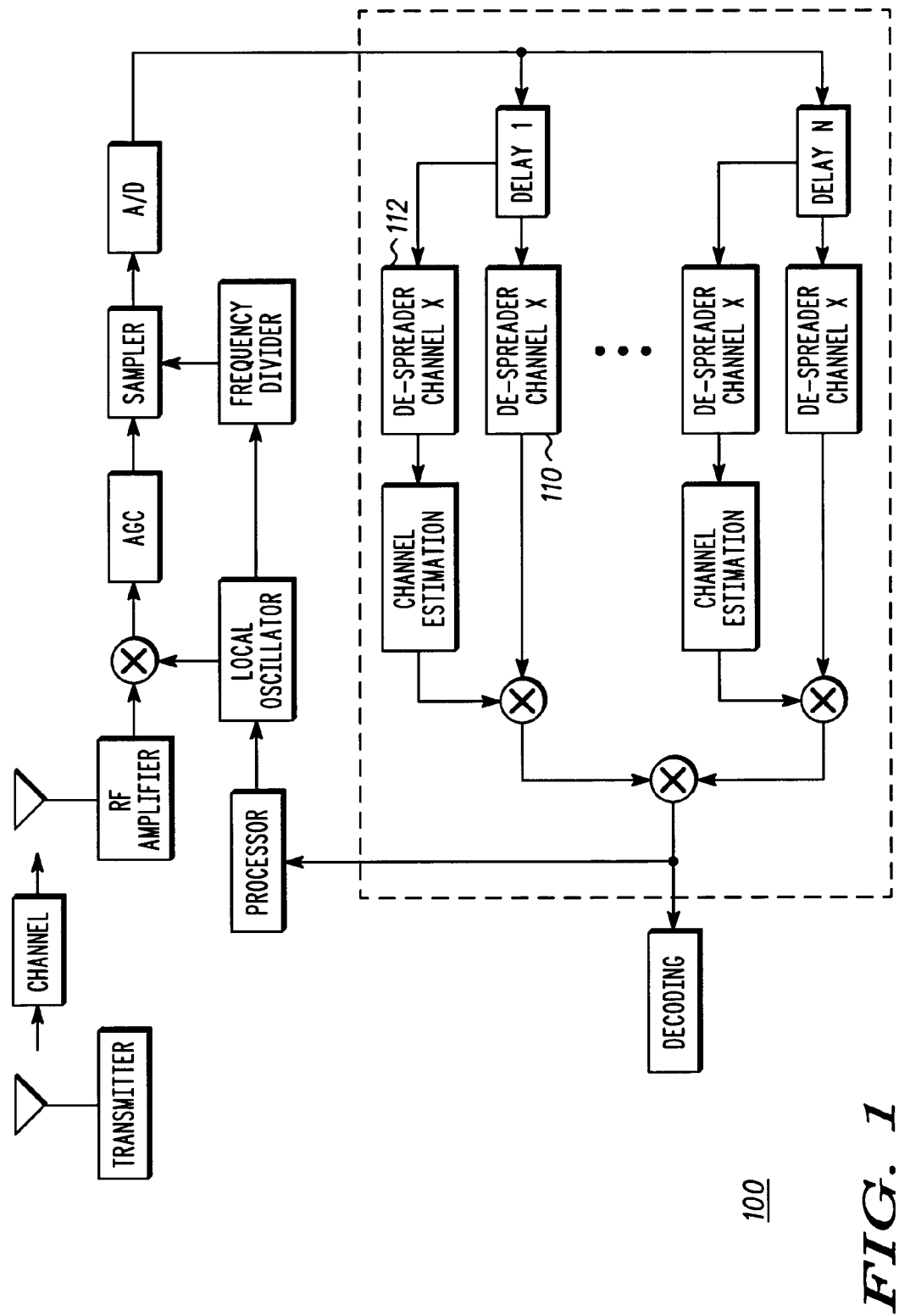
FIG. 1 is schematic block diagram of an exemplary communications receiver.

FIG. 1 is a partial schematic block diagram including an exemplary W-CDMA rake receiver 100 having multiple rake fingers with corresponding de-spreaders 110, 112 for corresponding channels. The received signal generally includes multiple channels, which may be separate physical channel and/or separate logical channels. Generally, the channels may have different symbol rates and/or spread factors.

In FIG. 1, the received signal is de-spread at de-spreaders 110 and 112 in each rake finger. In one embodiment, the de-spread symbol for the $k^{th}$ symbol of the $n^{th}$ slot on the $i^{th}$ propagation path of the $l^{th}$ physical channel is represented generally by the following expression:

$$d_l^i[n,k] = a_l[n,k] z_l^i[n,k] + \eta_l^i[n,k], \quad (1)$$

In Equation (1), $a_l[n, k]$ is the normalized (magnitude of one) transmitted symbol, which is known in the case of pilot symbols, and $\eta_l^i[n,k]$ is the noise. The quantity $z_l^i[n,k]$ is the propagation channel, whose magnitude squared represents the received power for the associated propagation path. In some embodiments, the de-spread signal is normalized by the spreading factor. Without loss of generality, the following assumes that the signals are normalized by the spreading factor, although more generally normalization is not required. The notation of Equation (1) above is used below to describe the proposed estimators.

Figure 2:
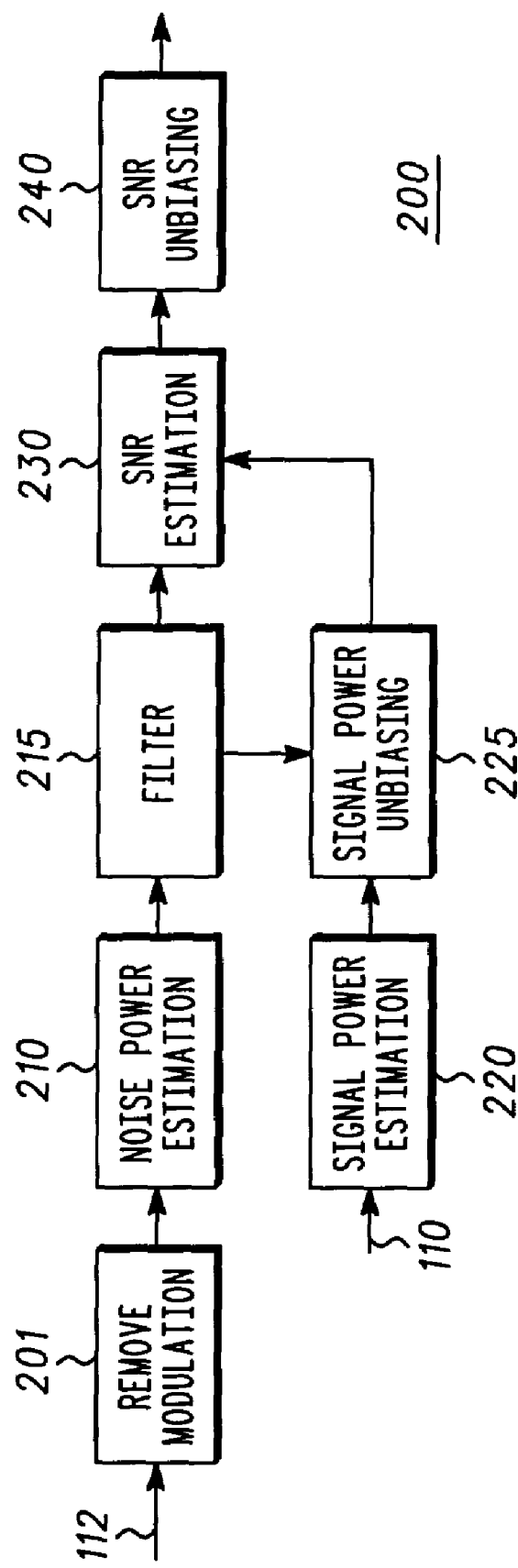
FIG. 2 is an exemplary process flow diagram for unbiasing an estimated signal to noise (SNR) ratio.

The modulation is first removed from the signal in block 201 of FIG. 2 using known pilot symbols prior to noise power estimation. The resulting symbols are then subtracted in pairs to generate an unbiased estimate of the noise. The estimated signal to noise ratio is based partly upon an estimated noise power estimation. In the process diagram 200 of FIG. 2, the noise power is estimated at block 210 after the modulation is removed.

The estimated noise power is generally averaged over some time interval. In most applications, the channel may be considered substantially constant over two symbols. The norm of this estimate produces an unbiased estimate of the noise power, which is averaged over time. In one embodiment, for example, the noise power is estimated by averaging a plurality of at least two noise power estimates obtained over an interval, wherein each of the noise power estimates is based on a difference between at least two symbols. Each symbol is used to compute not more than one difference, although in other embodiments each symbol is used to compute more than one of the differences used to estimate the noise power. More generally, the noise power estimate is based on weighted estimates of noise power on one or more channels, for example, on a Common Pilot Channel (CPICH) or on a Dedicated Pilot Channel, which is time multiplexed on a Dedicated Physical Channel (DPCH) in W-CDMA applications.

Suppose, for example, that there are $N_{PILOT}^l$ (even) pilot symbols per slot on the $l^{th}$ physical channel. In embodiments where a single pole infinite impulse response (IIR) filter is used, the noise power for the $n^{th}$ slot on the $i^{th}$ propagation path is estimated below in Equation (2) as follows:

$$\hat{\sigma}_{\eta_i^l}^2[n] = \alpha \hat{\sigma}_{\eta_i^l}^2[n-1] + \frac{1-\alpha}{N_{PILOT}^l} \sum_{k=p_{PILOT}^l/2}^{p_{PILOT}^l/2+N_{PILOT}^l/2-1} \qquad (2)$$

$$|a_l[n, 2k]^* d_i^l[n, 2k] - a_l[n, 2k+1]^* d_i^l[n, 2k+1]|^2,$$

In Equation (2), $p_{PILOT}^l$ is the position (starting from the beginning of a slot to which position 0 is assigned) of the first pilot symbol on the $l^{th}$ physical channel. And $\alpha$ is the pole of the Infinite Impulse Response (IIR) filter, which is used to filter the noise power estimation. The IIR filter pole is constrained by the condition $\alpha<1$.

In embodiments where a moving average Finite Impulse Response (FIR) filter is used, the noise power for the $n^{th}$ slot on the $i^{th}$ propagation path is estimated below in Equation (3) as follows:

$$\hat{\sigma}_{\eta_i^l}^2[n] = \frac{1}{K}\sum_{i=0}^{K-1} \frac{1}{N_{PILOT}^l} \sum_{k=p_{PILOT}^l/2}^{p_{PILOT}^l/2+N_{PILOT}^l/2-1} \qquad (3)$$

$$|a_l[n-i, 2k]^* d_i^l[n-i, 2k] -$$

$$a_l[n-i, 2k+1]^* d_i^l[n-i, 2k+1]|^2,$$

In Equation (3), K is the number of slots over which the moving average FIR filter filters the noise power estimates. Other filters may be used in other embodiments, for example, multi-pole IIR filters, or more general FIR filters. In FIG. 2, any filtering is performed at block 215.

In one embodiment, the noise power of one channel is estimated based upon an estimation of noise power on another channel. In W-CDMA applications, for example, unless the user equipment receives the signal from a beam antenna, it is usually preferable to perform the noise power estimation using the Common Pilot Channel (CPICH) rather than the Dedicated Physical Channel (DPCH) signal. The CPICH typically has more pilot symbols per slot than the DPCH and thus the accuracy of the noise power estimator is enhanced. When estimating noise power on one channel based upon the noise power of another channel, it may be necessary to scale the noise power estimation. In some embodiments, the different channels on which the noise estimates are made have different symbol rates. In the exemplary W-CDMA application, where the noise power on the DPCH is estimated based upon an estimation of the noise power on the CPICH, the estimation of the noise power on the DPCH is scaled by a ratio of the spreading factors of the CPICH and DPCH in Equation (4) as follows:

$$\hat{\sigma}_{\eta_i^{DPCH}}^2[n] = \frac{S_{CPICH}}{S_{DPCH}} \hat{\sigma}_{\eta_i^{CPICH}}^2[n]. \qquad (4)$$

The scaling is necessary because the spreading factor of the DPCH, $S_{DPCH}$, may be different from the spreading factor of the CPICH, $S_{CPICH}$. The scaling factor may be 1 or some other value. The relation of the spreading factors is generally dependent upon the normalization by the spreading factor, as discussed above. When the noise power estimation is performed using the CPICH instead of the DPCH, the variance is reduced by a factor $N_{PILOT}^{DPCH}/N_{PILOT}^{CPICH}$, which is a ratio of pilot symbols of the Dedicated Physical Channel (DPCH) and pilot symbols of the Common Pilot Channel (CPICH), for noise power estimation using the CPICH l=CPICH and $p_{PILOT}^{CPICH}=0$.

The estimated signal to noise ratio is also based upon an estimated signal power estimation. In FIG. 2, the signal power is estimated at block 220, after estimation of the noise power. Generally, the estimated signal power is based on weighted estimates of signal power for one or more channels. In the exemplary embodiment, the signal power is estimated in a channel different than the channel for which the noise power is estimated, channels x and y in FIG. 1. In the exemplary W-CDMA application, for example, the signal power is estimated on the DPCH and the noise power is estimated from the CPICH. In some embodiments, where the signal and noise power estimates are each based on estimates on more than one channel, at least some of the channels for which the signal power is estimated are different than some of the channels for which the noise power is estimated.

In the exemplary W-CDMA application, since the dedicated physical channel (DPCH) is power controlled, signal power estimation, unlike noise power estimation, must be estimated utilizing the DPCH. The exemplary estimator uses the dedicated pilot symbols, the data symbols, the power control symbols (TPC) and the frame format indicator symbols (TFCI). Suppose, for example, that there are $N_{PILOT}^{DPCH}$ dedicated pilot symbols, $N_{DATA}^{DPCH}$ data symbols, $N_{TPC}^{DPCH}$ TPC symbols and $N_{TFCI}^{DPCH}$ TFCI symbols per slot, then instantaneous signal power for the $n^{th}$ slot on the $i^{th}$ propagation path can be estimated as a linear combination of the four power estimators (the over bar refers to an estimate of the quantity underneath the bar) as follows in Equation (5)

$$\overline{\left|z_{i,DATA\,combined}^{DPCH}[n]\right|^2} = \kappa_{PILOT} \overline{\left|z_{i,PILOT}^{DPCH}[n]\right|^2} + \kappa_{DATA} \overline{\left|z_{i,PILOT}^{DPCH}[n]\right|^2} + \kappa_{TPC} \overline{\left|z_{i,TPC}^{DPCH}[n]\right|^2} + \kappa_{TFCI} \overline{\left|z_{i,TFCI}^{DPCH}[n]\right|^2}, \qquad (5)$$

where $\kappa_{PILOT}$, $\kappa_{DATA}$, $\kappa_{TPC}$ and $\kappa_{TFCI}$ are the combining coefficients given in Equation (6) as follows:

$$\begin{bmatrix} \kappa_{PILOT} \\ \kappa_{DATA} \\ \kappa_{TPC} \\ \kappa_{TFCI} \end{bmatrix} = \frac{1}{N_{PILOT}^{DPCH} \frac{\left|z_{i,PILOT}^{DPCH}[n]\right|^2}{\left|z_{i,DATA}^{DPCH}[n]\right|^2} + N_{DATA}^{DPCH} + N_{TPC}^{DPCH} \frac{\left|z_{i,TPC}^{DPCH}[n]\right|^2}{\left|z_{i,DATA}^{DPCH}[n]\right|^2} + N_{TFCI}^{DPCH} \frac{\left|z_{i,TFCI}^{DPCH}[n]\right|^2}{\left|z_{i,DATA}^{DPCH}[n]\right|^2}} \begin{bmatrix} N_{PILOT}^{DPCH} \\ N_{DATA}^{DPCH} \\ N_{TPC}^{DPCH} \\ N_{TFCI}^{DPCH} \end{bmatrix} \qquad (6)$$

and the four estimators due to the different "logical" channels are given by the following Equations:

$$\widehat{|z_{i,PILOT}^{DPCH}[n]|^2} = \left| \frac{1}{N_{PILOT}^{DPCH}} \sum_{k=P_{PILOT}^{DPCH}}^{P_{PILOT}^{DPCH}+N_{PILOT}^{DPCH}-1} a_{DPCH}[n,k]^* d_i^{DPCH}[n,k] \right|^2 - \frac{\hat{\sigma}_{\eta_i^{DPCH}}^2[n]}{N_{PILOT}^{DPCH}}, \quad (7)$$

$$\widehat{|z_{i,DATA}^{DPCH}[n]|^2} = \frac{1}{N_{DATA}^{DPCH}} \sum_{k=P_{DATA}^{DPCH}}^{P_{DATA}^{DPCH}+N_{DATA}^{DPCH}-1} |d_i^{DPCH}[n,k]|^2 - \hat{\sigma}_{\eta_i^{DPCH}}^2[n], \quad (8)$$

$$\widehat{|z_{i,TPC}^{DPCH}[n]|^2} = \left| \frac{1}{N_{TPC}^{DPCH}} \sum_{k=P_{TPC}^{DPCH}}^{P_{TPC}^{DPCH}+N_{TPC}^{DPCH}-1} d_i^{DPCH}[n,k] \right|^2 - \frac{\hat{\sigma}_{\eta_i^{DPCH}}^2[n]}{N_{TPC}^{DPCH}}, \quad (9)$$

$$\widehat{|z_{i,TFCI}^{DPCH}[n]|^2} = \frac{1}{N_{TFCI}^{DPCH}} \sum_{k=P_{TFCI}^{DPCH}}^{P_{TFCI}^{DPCH}+N_{TFCI}^{DPCH}-1} |d_i^{DPCH}[n,k]|^2 - \hat{\sigma}_{\eta_i^{DPCH}}^2[n] \quad (10)$$

In Equations (7) and (9), the signal is coherently averaged. The norm is then taken to generate a biased estimate of the signal power. In one embodiment, the signal power is at least partially unbiased based on the noise power estimator, as indicated at block 225 in FIG. 2. An unbiased signal power estimator results by subtracting the bias from the signal power estimator. In Equations (8) and (10), a biased estimate of the signal power is first obtained by taking the norm of the signal. In some embodiments, the estimate is then averaged to improve its accuracy. An unbiased estimator results by subtracting the bias from the estimator.

The combining coefficients may be optimized to weight each estimator according to its accuracy and to its power offset with respect to the other logical and/or physical channels. The signal power estimator uses the noise power estimator described earlier. It is assumed that the receiver knows the power ratios of Equation (6). If this is not the case, the power ratios may be estimated. If it is desired or necessary to neglect any set of symbols, the number of symbols may be assumed to be zero. This causes the corresponding coefficient to evaluate to zero, as shown in Equation (6).

In FIG. 2, at block 230, an estimated signal to noise ratio (SNR) is based upon the estimated signal power and the estimated noise power discussed above. Even if both the signal power and the noise power estimators derived earlier are unbiased, the ratio of the two estimators results in a biased SNR estimator.

In FIG. 2, at block 240, the SNR is unbiased. In one embodiment, generally, the estimated SNR is at least partially unbiased based on a time period or interval over which the noise power is averaged and more particularly based upon the number of differences used to average the noise power of the signal and/or based upon the filter parameter. The estimated SNR is also at least partially unbiased based upon the signal power estimation, for example, based upon a ratio of a desired signal channel power to another channel power, which ratio may be subtracted from the estimated SNR. In one embodiment, the unbiased estimated SNR is obtained in Equation (11) as follows:

$$\widehat{SIR}_{combined}^{DPCH}[n] = \frac{L-1}{L} \cdot \frac{\left|\hat{z}_{i,DATA}^{DPCH}[n]\right|^2_{combined}}{\hat{\sigma}_{\eta_i^{DPCH}}^2[n]} - \frac{1}{L}\left(\frac{\kappa_{PILOT}}{N_{PILOT}^{DPCH}} + \kappa_{DATA} + \frac{\kappa_{TPC}}{N_{TPC}^{DPCH}} + \kappa_{TFCI}\right), \quad (11)$$

where for the single pole IIR filter embodiment L is given by Equation (12) as follows:

$$L = \text{round}\left(\frac{N_{PILOT}^l}{2} \frac{1+\alpha}{1-\alpha}\right). \quad (12)$$

where $\alpha$ is a pole of the IIR filter discussed above. For the moving average FIR filter embodiment, L is given by Equation (13) as follows:

$$L = \text{round}\left(K \frac{N_{PILOT}^l}{2}\right). \quad (13)$$

More generally, L is a function of filter parameters. Thus the biased SNR is scaled by the factor (L−1)/L and additional bias is subtracted from the SNR, preferably after scaling the SNR. In the exemplary embodiment, the quantity $$\frac{1}{L}\left(\frac{\kappa_{PILOT}}{N_{PILOT}^{DPCH}} + \kappa_{DATA} + \frac{\kappa_{TPC}}{N_{TPC}^{DPCH}} + \kappa_{TFCI}\right)$$

is subtracted from the estimated SNR. The estimator of the rake receiver output SIR is given by Equation (14) as follows:

$$\widehat{SIR}_{combined}^{DATA}[n] = \sum_{i=1}^{M} \widehat{SIR}_{combined}^{i,DATA}[n]. \quad (14)$$

where M is the number of paths.

While the present disclosure and what are considered presently to be the best modes of the inventions have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a wireless communications device, the method comprising:
 estimating noise power of a signal;
 averaging the noise power over a time interval;

estimating signal power of the signal;

estimating a signal to noise ratio based on the estimated noise power and the estimated signal power;

at least partially unbiasing the estimated signal to noise ratio based on the interval over which the noise power is averaged.

2. The method of claim 1, at least partially unbiasing the estimated signal to noise ratio based on the estimated noise power.

3. The method of claim 1, further unbiasing the estimated signal to noise ratio based on the estimated signal power.

4. The method of claim 1, averaging the noise power based on at least one symbol difference, at least partially unbiasing the estimated signal to noise ratio based on the number of differences used to average the noise power of the signal.

5. The method of claim 1, at least partially unbiasing the estimated signal to noise ratio includes subtracting a quantity from the estimated signal to noise ratio.

6. The method of claim 5, at least partially unbiasing the estimated signal to noise ratio includes scaling the estimated signal to noise ratio before subtracting the quantity from the estimated signal to noise ratio.

7. The method of claim 1, at least partially unbiasing the estimated signal to noise ratio includes subtracting a quantity from the estimated signal to noise ratio, the quantity is a function of a ratio of power of a desired signal channel to power of another channel.

8. The method of claim 1, estimating noise power includes averaging noise power of the signal, filtering the estimated noise power after averaging, at least partially unbiasing the estimated signal to noise ratio based on a parameter of a filter used to filter the estimated noise power.

9. The method of claim 1, at least partially unbiasing the estimated signal to noise ratio by substantially unbiasing the estimated signal to noise ratio.

10. The method of claim 1, at least partially unbiasing the estimated signal to noise ratio by completely unbiasing the estimated signal to noise ratio.

11. The method of claim 1, the signal includes a plurality of channels, estimating the signal power on a channel based upon estimation of signal power on a different channel.

12. A method in a wireless communications device, the method comprising:

receiving a signal having a plurality of channels at the wireless communications device, estimating signal power on one of the plurality of channels;

estimating noise power on another one of the plurality of channels;

at least partially unbiasing the signal power based on the noise power.

13. The method of claim 12, estimating signal power includes estimating signal power based on weighted estimates of signal power for at least two channels, estimating noise power includes estimating noise power based on weighted estimates of noise power for at least two channels, at least some of the channels for which signal power is estimated are different than some of the channels for which noise power is estimated.

14. The method of claim 12, scaling noise power before at least partially unbiasing the signal power.

15. The method of claim 12, estimating signal power on a data channel, estimating noise power on a pilot channel.

16. The method of claim 12, estimating a signal to noise ratio based on the at least partially unbiased signal power and based on the estimated noise power, at least partially unbiasing the signal to noise ratio.

17. A method in a wireless communications device, the method comprising:

receiving a signal at the wireless communications device, the signal having first and second channels;

estimating noise power of the first channel, the estimation of the noise power of the first channel based on an estimation of noise power on the second channel;

scaling the estimation of the noise power on the second channel.

18. The method of claim 17, scaling the estimation of the noise power on the second channel by a factor associated with the second channel divided by a factor associated with the first channel.

19. The method of claim 17, receiving the signal at the wireless communications device includes receiving a signal having first and second separate physical channels.

20. The method of claim 17, receiving the signal at the wireless communications device includes receiving a signal having first and second separate logical channels.

21. The method of claim 17, estimating signal power on the first channel, estimating a signal to noise ratio based on the estimated noise power and the estimated signal power.

22. The method of claim 17, receiving the signal at the wireless communications device includes receiving a signal having a pilot channel and a data channel, estimating noise power on the data channel based on an estimation of noise power on the pilot channel.

23. The method of claim 22, estimating signal power on the data channel, estimating a signal to noise ratio based on the estimated signal power and the estimated noise power.

24. The method of claim 22, scaling the estimation of the noise power on the pilot channel by a ratio of a spreading factor of the pilot channel divided by a spreading factor of the data channel.

25. The method of claim 17, estimating noise power by averaging a plurality of at least two noise power estimates obtained over a time interval, each of the at least two noise power estimates based on a difference between symbols.

26. The method of claim 17, estimating signal power on the first channel, estimating a signal to noise ratio based on the estimated noise power and the estimated signal power, at least partially unbiasing the signal to noise ratio.

27. A method in a wireless communications device, the method comprising:

receiving a non-beam formed signal at the wireless communications device, the non-beam formed signal having first and second channels, the first and second channels having different symbol rates;

estimating noise power of the first channel, the noise power of the first channel based on an estimation of noise power on the second channel.

28. The method of claim 27, scaling the estimation of the noise power on the second channel by a factor associated with the second channel divided by a factor associated with the first channel.

29. The method of claim 27,
estimating noise power by averaging a plurality of at least two noise power estimates obtained over a time interval,
each of the at least two noise power estimates based on a difference between symbols.

30. The method of claim 27,
estimating signal power of the first channel,
estimating a signal to noise ratio based on the estimated signal power and based on the estimated noise power,
at least partially unbiasing the signal to noise ratio.

* * * * *